United States Patent [19]

Tanaka et al.

[11] Patent Number: 4,788,048
[45] Date of Patent: Nov. 29, 1988

[54] PROCESS FOR CONVERSION OF $UF_6$ TO $UO_2$

[75] Inventors: Hiroshi Tanaka; Akio Umemura, both of Saitama, Japan

[73] Assignee: Mitsubishi Kinzoku Kabushiki Kaisha, Tokyo, Japan

[21] Appl. No.: 872,171

[22] Filed: Jun. 9, 1986

[30] Foreign Application Priority Data

Jun. 11, 1985 [JP] Japan ................................. 60-126855

[51] Int. Cl.[4] ............................................ C01G 43/025
[52] U.S. Cl. ..................................... 423/261; 423/19; 423/253; 423/260
[58] Field of Search ................... 423/261, 253, 260, 19

[56] References Cited

U.S. PATENT DOCUMENTS

| | | | |
|---|---|---|---|
| 3,477,830 | 11/1969 | Hackstein et al. | 423/261 |
| 3,765,844 | 10/1973 | Rode | 423/19 |
| 3,906,081 | 9/1975 | Welty | 423/261 |
| 4,020,146 | 4/1977 | Knudsen | 423/261 |

Primary Examiner—John F. Terapane
Assistant Examiner—Virginia B. Caress
Attorney, Agent, or Firm—Edward J. Brenner

[57] ABSTRACT

A process for conversion of gaseous $UF_6$ to $UO_2$ powders by using a fluidized bed reaction apparatus comprising pyrohydrolizing gaseous $UF_6$ and steam to obtain $UO_2F_2$ particles, hydrating and dehydrating the $UO_2F_2$ particles to $UO_2F_2$ anhydride and reducing the $UO_2F_2$ anhydride to $UO_2$ powders. The obtained $UO_2$ powders are suitable for production of nuclear fuels in power plant owing to its good ceramic properties, low fluorine contents and free flowability.

6 Claims, 1 Drawing Sheet

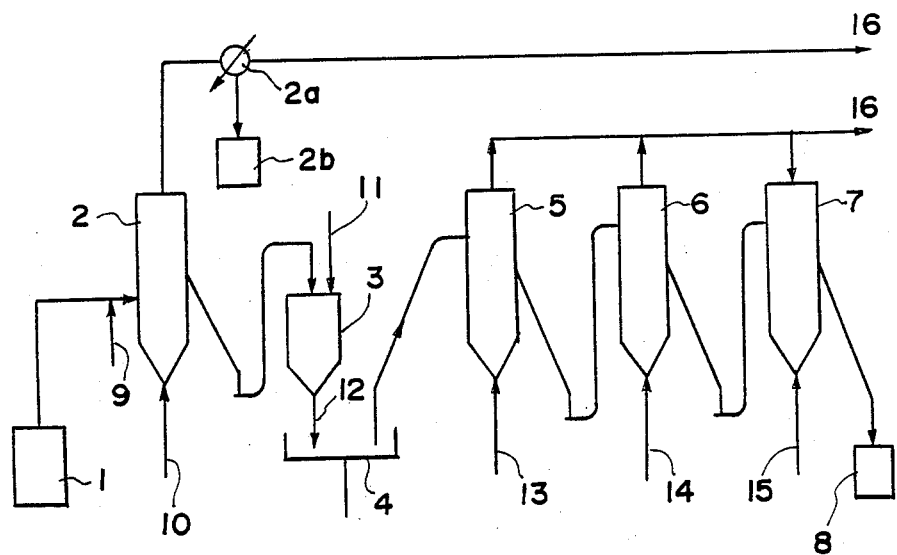

1

PROCESS FOR CONVERSION OF UF₆ TO UO₂

BACKGROUND OF THE INVENTION

The present invention relates to a process for conversion of gaseous $UF_6$ to $UO_2$ powders which is suitable for production of nuclear fuels in power plant owing to its good ceramic properties, small fluorine contents and free flowability.

As a process for converting $UF_6$ into $UO_2$ powders for nuclear fuels in a power plant, gaseous $UF_6$ has been conventionally converted to be $UO_2$ powder in a industrial scale by two different process, that is, a wet process and a dry process. The wet process is defective in that many steps required make the operation complex and a large quantity of waste solution is produced.

On the other hand, the dry process has defects of having poor ceramic properties of $UO_2$ powders as a product and a large fluorine contents of the product, but it has advantages of having simple steps and also a small quantity of waste solution produced. Therefore, adoption of the dry process has been recently increased by overcoming the defects above mentioned. As the dry process, there are a process using a rotary kiln, a process using a fluidized bed reaction apparatus and a process using a flame combustion reaction apparatus. Of these processes, the process using a fluidized bed reaction apparatus produces UO powders as a product which has a free flowability, thus making handling of the $UO_2$ powders in following steps very much easier, as compared with that of the other processes.

In the process using a fluidized bed reaction apparatus which has the advantages mentioned, the ceramic properties of the $UO_2$ powders produced become poorer and also the fluorine contents thereof become larger, as compared with those of the other processes. The poor ceramic properties of the $UO_2$ powders is due to a formation of $UO_2F_2$ in fine particles by gas phase reaction of gaseous $UF_6$ with steam as shown in the following equation (1) and a formation of $UF_4$ in converting of $UO_2F_2$ to $UO_2$ with hydrogen gas as shown in the following equations (2) and (3). In the conventional dry processes, especially in the process using a fluidized bed reaction apparatus, the reaction is mostly composed of the following two stage reactions.

$$UF_6 + 2H_2O \rightarrow UO_2F_2 + 4HF \quad (1)$$

$$UO_2F_2 + H_2 \rightarrow UO_2 + 2HF \quad (2)$$

In this process, $UF_4$ is apt to be formed by a reverse reaction as shown in the equation (3). Namely, the UO powder may possibly be hydrofluorinated to UF powder.

$$UO_2 + 4HF \rightarrow UF_4 + 2H_2O \quad (3)$$

$UF_4$ is a substance which is apt to sinter at a relatively low temperature (about 1000° C.) and begins to sinter at the operating temperature of the equation (2) to hinder a defluorinating reaction which is important for lowering fluorine contents of $UO_2$ powder as a product. Therefore, it was formerly required to add an excess of steam in the equation (2) to suppress hydrofluorination of the $UO_2$ powder. As a result, the fluidized bed operation became more complex and at the same time the excessively added steam increased a quantity of waste solution substantially. Further, as a long time was required for defluorinating $UO_2$ powder as a product, it was exposed to a high temperature for a long time. Consequently the ceramic properties of $UO_2$ powders were apt to be substantially reduced.

Further, another defect of the case in which the fluidized bed reaction apparatus is used relates to a stability of the operation of the fluidized bed which converts $UF_6$ into $UO_2F_2$.

Namely, the $UO_2F_2$ particles form the fluidized bed, but gaseous $UF_6$ blown into the fluidized bed reacts with steam as a fluidizing gas introduced through the bottom of the fluidized bed to form $UO_2F_2$ particles which deposit on the surface of $UO_2F_2$ particles already existing. As the result, the thus deposited $UO_2F_2$ cause growth of the $UO_2F_2$ particles. On the other hand, a part of the $UO_2F_2$ particles are pulverized by abrasion owing to collison with each other. The mean particle size of the $UO_2F_2$ particles is determined by these balances, but in the conventional fluidized bed reaction apparatus, the thus obtained $UO_2F_2$ particles are apt to grow substantially. Therefore, it was required to supply new $UO_2F_2$ particles into the fluidized bed to maintain a stable fluidized bed operation. Consequently, the process system became complicated and the operation also became troublesome.

BRIEF SUMMARY OF THE INVENTION

It is an object of the present invention to provide a process for conversion of gaseous $UF_6$ to $UO_2$ powders which is suitable for production of nuclear fuels in power plant owing to its good ceramic properties, low fluorine contents and free flowability.

According to the present invention, there is provided:

1. A process for conversion of $UF_6$ to $UO_2$ by using a fluidized bed reaction apparatus comprising
    (a) a first step of pyrohydrolizing gaseous $UF_6$ and steam in said fluidized bed to obtain $UO_2F_2$ particles,
    (b) a second step of reacting said $UO_2F_2$ particles with water to obtain $UO_2F_2$ hydrate,
    (c) a third step of dehydrating said $UO_2F_2$ hydrate by heating to $UO_2F_2$ anhydride,
    (d) a fourth step of reducing said $UO_2F_2$ anhydride with hydrogen gas or hydrogen gas and steam to convert to $UO_2$ powders.

2. A process for conversion of $UF_6$ to $UO_2$ by using a fluidized bed reaction apparatus comprising
    (a) a first step of pyrohydrolizing gaseous $UF_6$ and steam in said fluidized bed to obtain $UO_2F_2$ particles,
    (b) a second step of hydrating said $UO_2F_2$ particles with water to $UO_2F_2$ hydrate,
    (c) a third step of dehydrating said $UO_2F_2$ hydrate by heating to $UO_2F_2$ anhydride,
    (d) a fourth step of calcining said $UO_2F_2$ anhydride with steam to convert to $UO_3$ or a mixture of $UO_3$ and $U_3O_8$ particles
    (e) a fifth step of reducing said $UO_3$ or said mixture of $UO_3$ and $U_3O_8$ with hydrogen gas or hydrogen gas and steam to convert to $UO_2$ powders.

Based on the above processes 1 and 2, following processes 3 and 4 are also within the scope of the present invention.

3. A process for conversion of $UF_6$ to $UO_2$ by using a fluidized bed reaction apparatus comprising (a) a first step of pyrohydrolizing gaseous $UF_6$ and steam in said fluidized bed to obtain $UO_2F_2$ particles, (b) a second step of hydrating said $UO_2F_2$ particles with water solution added with ammonia containing water, oxalic acid or hydrogen peroxide to $UO_2F_2$ hydrate, (c) a third step of dehydrating said $UO_2F_2$ hydrate by heating to $UO_2F_2$ anhydride, (d) a fourth step of reducing said $UO_2F_2$ anhydride with hydrogen gas or a mixture of hydrogen gas and steam to convert to $UO_2$ powders 4. A process for conversion of $UF_6$ to $UO_2$ by using a fluidized bed reaction apparatus comprising (a) a first step of pyrohydrolizing gaseous $UF_6$ and steam in said fluidized bed to obtain $UO_2F_2$ particles, (b) a second step of hydrating said $UO_2F_2$ particles with a solution added with ammonia containing water, oxalic acid or hydrogen peroxide to $UO_2F_2$ hydrate, (c) a third step of dehydrating said $UO_2F_2$ hydrate by heating to $UO_2F_2$ anhydride, (d) a fourth step of reducing said $UO_2F_2$ anhydride with steam to convert to $UO_3$ or mixture of $UO_3$ and $U_3O_8$ partices, (e) a fifth step of reducing said $UO_3$ or said mixture of $UO_3$ and $U_3O_8$ with hydrogen gas or a mixture of hydrogen gas and steam to $UO_2$ powders.

Further, in the present invention, hydration of the $UO_2F_2$ particles to $UO_2F_2$ hydrate can be carried out with steam as a water source. Further more, in the present invention, supply of gaseous $UF_6$ and steam into the fluidized bed is carried out more effectively by using a twin fluid atomizer.

DETAILED DESCRIPTION OF THE INVENTION

In the present invention, the steps of converting gaseous $UF_6$ to $UO_2$ powders are as flollows:

| | | |
|---|---|---|
| the first step | $UF_6 + 2H_2O \rightarrow UO_2F_2 + 4HF$ | (1) |
| the second step | $UO_2F_2 + nH_2O \rightarrow UO_2F_2 \cdot nH_2O$ | (2) |
| the third step | $UO_2F_2 \cdot nH_2O \rightarrow UO_2F_2 + nH_2O$ | (3) |
| the fourth step or | $UO_2F_2 + H_2 \rightarrow UO_2 + 2HF$ | (4) |
| the first step | $UF_6 + 2H_2O \rightarrow UO_2F_2 + 4HF$ | (1) |
| the second step | $UO_2F_2 + nH_2O \rightarrow UO_2F_2 \cdot nH_2O$ | (2) |
| the third step | $UO_2F_2 \cdot nH_2O \rightarrow UO_2F_2 + nH_2O$ | (3) |
| the fourth step | $UO_2F_2 + H_2O \rightarrow UO_3 + 2HF$ | (4) |
| | $UO_2F_2 + H_2O \rightarrow U_3O_8 + 2HF + 1/6 O_2$ | |
| the fifth step | $UO_3 + H_2 \rightarrow UO_2 + H_2O$ | (5) |
| | $U_3O_8 + 2H_2 \rightarrow 3UO_2 + 2H O$ | |

Of these steps, the most important point involves the fact that in the second step, $UO_2F_2$ particles formed in the fluidized bed of the first step are hydrated and then in the third step, the hydrated $UO_2F_2$ particles are dehydrated by heating.

It is known that the $UO_2$ powders obtained by conversion of the dehydrated $UO_2F_2$ particles have, a remarkably larger specific surface area and improved ceramic properties, but combination of the operation with the process of converting $UF_6$ to $UO_2$ using the fluidized bed can overcome the large defect of the conventional process that the $UO_2$ powders formed are unsuitable for fabrication of nuclear fuels in power plant owing to its low ceramic properties and slow defluorinating velocity can utilize also effectively the large advantage of the conventional process in which the $UO_2$ powders formed have an extremely good flowability.

Further, in the steps of converting $UO_2F_2$ particles to $UO_2$ powders of the present invention, the $UO_2F_2$ particles are calcined with only steam to $UO_3/U_3O_8$ to suppress a formation of $HF_4$ which hinders a defluorinating reaction of $UO_2F_2$ and then the $UO_3/U_3O_8$ are reduced with hydrogen gas to $UO_2$ powders. Combination of these operations with the above stated conventional process can improve the defect thereof moreover.

The easily defluorinated $UO_2$ powders obtained by the present invention posses a fundamental condition suitable for fabrication of nuclear fuels in power plant owing to its good ceramic properties and at the same time have an extremely good flowability which makes handling thereof in following steps very easy and can omit a granulating operation which is usually carried out in fabrication of pellet for nuclear fuels.

Further, when a solution added with such reagent as ammonia, oxalic acid or hydrogen peroxide is used instead of water in hydration of the $UO_2F_2$ particles, these reagents form uranate, uranyl salt. Therefore, the added quantity of these reagents can control the ceramic properties of $UO_2$ powders formed. Further, when steam is used as a water source instead of water, homogeneous hydration can be easily obtained due to its good dispersion and at the same time choice of apparatus can be more free. In the fluidized bed of the first step, it is effective to use a twin fluid atomizer for controlling the particle size of the formed $UO_2F_2$ particles. This is due to the phenomenon that when the twin fluid atomizer is used, the gaseous UF atomized from central nozzle of the atomizer is pyrohydrolized with steam atomized from periphery of the nozzle to form fine particles of $UO_2F_2$ which become nucleus of following granulation and average particle size of $UO_2F_2$ particles which form the fluidized bed is decreased. Further, when the twin fluid atomizer is used, the formed $UO_2F_2$ particles become highly reactive owing to its fine granule form to promote proceeding of following reactions.

The drawing is a schematic flow diagram of the process in accordance with the present invention. In the drawing, $UF_6$ is vaporized in a vaporizing chamber 1, and the gaseous $UF_6$ is atomized. At the same time, steam as a fluidizing gas is introduced into the bottom of the apparatus 2 through pipe 10. A part of gaseous $UF_6$ reacts immediately with steam as an atomizing gas near the atomizer to form $UO_2F_2$ particle. A part of the newly fomred $UO_2F_2$ particles are deposited on the surface of $UO_2F_2$ as seed material, and the $UO_2F_2$ particles are growing. Further, a part of these $UO_2F_2$ particles is pulverized by collison with each other to be fine particles. The $UO_2F_2$ partices are controlled in particle size by these phenomena and form the fluidized bed.

The operating temperature of the first fluidized bed 2 is less than 400° C., preferably in the range of 200°-300° C. in consideration of ceramic properties of the particles and control of the particle size. HF produced in the first fluidized bed 2 is recovered as HF solution by HF condenser 2a to be stored in HF receiver 2b. The newly formed $UO_2F_2$ particles are discharged out of the first fluidized bed 2 through the overflow pipe which is located at the upper part of the fluidized bed 2 and are sent to the second reactor 3.

In the reactor 3, the $UO_2F_2$ particles are hydrated with water introduced into the reactor 3 through pipe 11. The operating temperature is less than 100° C., preferably in the range of 10° C.-50° C. in consideration of hydration velocity.

The $UO_2F_2$ hydrate is passed to chamber 4 from which it is sent to a third fluidized bed 5 where it is dehydrated by heating. Air as a fluidizing gas is introduced into the bottom of the apparatus 5 through pipe 13. The operating temperature is less than 200° C., preferably in the range of 120° C.-150° C. The formed $UO_2F_2$ anhydride is discharged out of the fluidized bed 5 through the overflow pipe which is located at the upper part of the fluidized bed 5 and ssent to a fourth fluidized bed 6 where it is calcined with steam as reaction fluidizing gas introduced to the bottom of the apparatus 6 through pipe 14 to convert to $UO_3$ or $U_3O_8$ particles. The operating temperature is less than 700° C., preferably in the range of 450° C.-600° C. at which $UO_2$ powders are formed. Further, when the operating temperature is in the range of 500° C.-600° C., a mixture of $UO_3$ and $U_3O_8$ is formed. The $UO_3$ or $U_3O_8$ particles are discharged out of the apparatus 6 through the overflow pipe and sent to a fifth fluidized bed 7 where they are reduced with a mixture of steam and hydrogen gas introduced to the bottom of the apparatus 7 through pipe 15 to convert $UO_2$ powders. The $UO_2$ powder is received as a product by a container 8. This operating temperature is less than 700° C., preferably in the range of 500° C.-600° C. in consideration of ceramic properties of the $UO_2$ powder.

The waste gas from the reaction apparatus 2, 5, 6, 7 is led to a waste gas treatment apparatus through a pipe 16.

The features of the present invention are as follows:

(1) The $UO_2$ powder formed has good ceramic properties, low fluorine contents and good flowability. Therefore, it is suitable for nuclear fuels in power plant. Such $UO_2$ powder as that of the present invention can not be obtained by conventional process.

(2) The good flowability of the $UO_2$ powder can make its handling in following steps very easy and can omit granulating operation before pelletizing which is generally carried out for fabricating nuclear fuels.

The following examples are illustrative of the present invention. However, it is understood that these examples are merely examplary and do not limit the scope the present invention.

Example

Three pilot runs were made using the processes by the present invention.

In case 1 corresponding to process 1, $UO_2F_2$ particles formed by the first fluidized bed are hydrated, dehydrated and directly reduced to $UO_2$ powders.

In case 2 corresponding to process 2, $UO_2F_2$ particles formed by the first fluidized bed are hydrated, dehydrated, calcined with steam to convert to $UO_3$ or $U_3O_8$ and the $UO_3$ or $U_3O_8$ are reduced to $UO_2$ powders.

In case 3 corresponding to process 3, $UO_2F_2$ particles formed by the first fluidized bed are hydrated with ammonia containing water, dehydrated and reduced to $UO_2$ powders.

As a comparative example, one pilot run was made using the conventional dry process. In the comparative case, $UO_2F_2$ particles formed by the first fluidized bed were directly reduced to $UO_2$ powders.

The fluidized beds used in these runs are 83 mm in diameter. The operating conditions are shown in Table 1. The characteristics of the $UO_2$ powders obtained in these runs are shown in Table 2.

Table 2 shows that the $UO_2$ powders of the process by the present invention are smaller in bulk density and in mean particle size, larger in specific surface area and lower in residual fluorine contents than those of the conventional dry process. Therefore, the $UO_2$ powder obtained by the process of the present invention is suitable for fabrication of nuclear fuels.

TABLE 1

|  | present invention | | | comparative |
|---|---|---|---|---|
|  | case 1 | case 2 | case 3 | case |
| 1st fluidized bed | | | | |
| bed temperature (°C.) | 280 | 280 | 280 | 280 |
| $UF_6$ rate (g/min) | 90 | 90 | 90 | 90 |
| atomizer steam rate (g/min) | 14 | 14 | 14 | 0 |
| fluidizing gas velocity (cm/s) | 25 | 25 | 25 | 25 |
| $UO_2F_2$ production rate (g/min) | 79 | 79 | 79 | 79 |
| use of twin fluid atomizer | used | used | used | not used |
| 2nd reactor | | | | not used |
| reaction temperature (°C.) | 20 | 20 | 20 | |
| $UO_2F_2$ rate (g/min) | 79 | 79 | 79 | |
| water rate (g/min) | 9 | 9 | 9* | |
| formed $UO_2F_2$ hydrate (g/min) | 86 | 86 | 86 | |
| 3rd fluidized bed | | | | not used |
| bed temperature (°C.) | 170 | 170 | 170 | |
| $UO_2F_2$ hydrate (g/min) | 86 | 86 | 86 | |
| fluidizing gas velocity (cm/s) | 20 | 20 | 20 | |
| formed $UO_2F_2$ anhydride (g/min) | 79 | 79 | 79 | |
| 4th fluidized bed | | | | not used |
| bed temperature (°C.) | not used | 500 | 500 | |
| $UO_2F_2$ rate (g/min) | | 79 | 79 | |
| fluidizing gas velocity (cm/s) | | 20 | 20 | |
| formed $UO_3/U_3O_8$ (g/min) | | 69/4 | 69/4 | 79 |
| 5th fluidized bed | | | | |
| bed temperature (°C.) | 600 | 600 | 560 | 600 |
| $UO_3/U_3O_8$ rate | 76 | 73 | 79 | |
| fluidizing gas velocity (cm/s) | 20 | 20 | 20 | 20 |
| hydrogen/steam (mol. ratio) | 1/1 | 1/1 | 1/1 | 1/1 |
| formed $UO_2$ (g/min) | 69 | 69 | 69 | 69 |

*water added with ammonia 1%

TABLE 2

|  | present invention | | | comparative |
|---|---|---|---|---|
| Characteristics of $UO_2$ powder | case 1 | case 2 | case 3 | case |
| bulk density (g/cm³) | 2.1 | 2.0 | 1.9 | 2.8 |
| specific surface area (m²/g) | 2.6 | 2.9 | 3.1 | 1.0 |
| mean partice size (μm) | 96 | 98 | | 145 |
| U content (% U) | 87.9 | 87.8 | 87.7 | 87.8 |
| residual fluorine contents (ppm) | 58 | 41 | 38 | 278.0 |

What is claimed, is:

1. A process for conversion of $UF_6$ to $UO_2$ by using a fluidized bed reaction apparatus comprising
   (a) a first step of pyrohydrolizing gaseous $UF_6$ and steam in said fluidized bed to obtain $UO_2F_2$ particles at temperatures of less than 400° C.,
   (b) a second step of hydrating said $UO_2F_2$ particles with water to $UO_2F_2$ hydrate at temperatures of less than 100° C., (c) a third step of dehydrating said $UO_2F_2$ hydrate by heating to $UO_2F_2$ anhydride at temperatures of less than 200° C., (d) a fourth step of reducing said $UO_2F_2$ anhydride with hydrogen gas or a mixture of hydrogen gas and steam to convert to $UO_2$ powders at temperatures of less than 700° C.

2. A process for conversion of $UF_6$ to $UO_2$ by using a fluidized bed reaction apparatus comprising (a) a first step of pyrohydrolizing gaseous $UF_6$ and steam in said fluidized bed to obtain $UO_2F_2$ particles at temperatures of less than 400° C., (b) a second step of hydrating said $UO_2F_2$ particles with water to $UO_2F_2$ hydrate at temperatures of less than 100° C., (c) a third step of dehydrating said $UO_2F_2$ hydrate by heating to $UO_2F_2$ anhydride at temperatures of less than 200° C., (d) a fourth step of calcining said $UO_2F_2$ anhydride with steam to convert to $UO_3$ or a mixture of $UO_3$ and $U_3O_8$ particles at temperatures of less than 700° C., (e) a fifth step of reducing said $UO_3$ or said mixture of $UO_3$ and $U_3O_8$ with hydrogen gas or a mixture of hydrogen gas and steam to convert to $UO_2$ powders at temperatures of less than 700° C.

3. A process for conversion of $UF_6$ to $UO_2$ by using a fluidized bed reaction apparatus comprising (a) a first step of pyrohydrolizing gaseous $UF_6$ and steam in said fluidized bed to obtain $UO_2F_2$ particles at temperatures of less than 400° C., (b) a second step of hydrating said $UO_2F_2$ particles with a solution added with ammonia, oxalic acid or hydrogen peroxide to $UO_2F_2$ hydrate at temperatures of less than 100° C., (c) a third step of dehydrating said $UO_2F_2$ hydrate by heating to $UO_2F_2$ anhydride at temperatures of less than 200° C., (d) a fourth step of reducing said $UO_2F_2$ anhydride with hydrogen gas or a mixture of hydrogen gas and steam to convert $UO_2$ powders at temperatures of less than 700° C.

4. A process for conversion of $UF_6$ to $UO_2$ by using a fluidized bed reaction apparatus comprising (a) a first step of pyrohydrolizing gaseous $UF_6$ and steam in said fluidized bed to obtain $UO_2F_2$ particles at temperatures of less than 400° C., (b) a second step of hydrating said $UO_2F_2$ particles with a solution added with ammonia, oxalic acid or hydrogen peroxide to $UO_2F_2$ hydrate at temperatures of less than 100° C., (c) a third step of dehydrating said $UO_2F_2$ hydrate by heating to $UO_2F_2$ anhydride at temperatures of less than 200° C., (d) a fourth step of calcining said $UO_2F_2$ anhydride with steam to convert to $UO_3$ or a mixture of $UO_3$ and $U_3O_8$ particles at temperatures of less than 700° C., (e) a fifth step of reducing said $UO_3$ or said mixture of $UO_3$ and $U_3O_8$ with hydrogen gas or a mixture of hydrogen gas and steam to convert to $UO_2$ powders at temperatures of less than 700° C.

5. A process for conversion of $UF_6$ to $UO_2$ powders as claimed in any one of claim 1–claim 4, wherein said gaseous $UF_6$ and steam are fed into said fluidized bed by using a twin fluid atomizer.

6. A process for conversion of $UF_6$ to $UO_2$ as claimed in any one of claim 1–claim 4, wherein said hydration of said $UO_2F_2$ particles to $UO_2F_2$ hydrate is carried out with steam added.

* * * * *